March 15, 1949.  C. B. SCHNEIBLE  2,464,264
SETTLING APPARATUS
Filed June 4, 1945  2 Sheets-Sheet 1
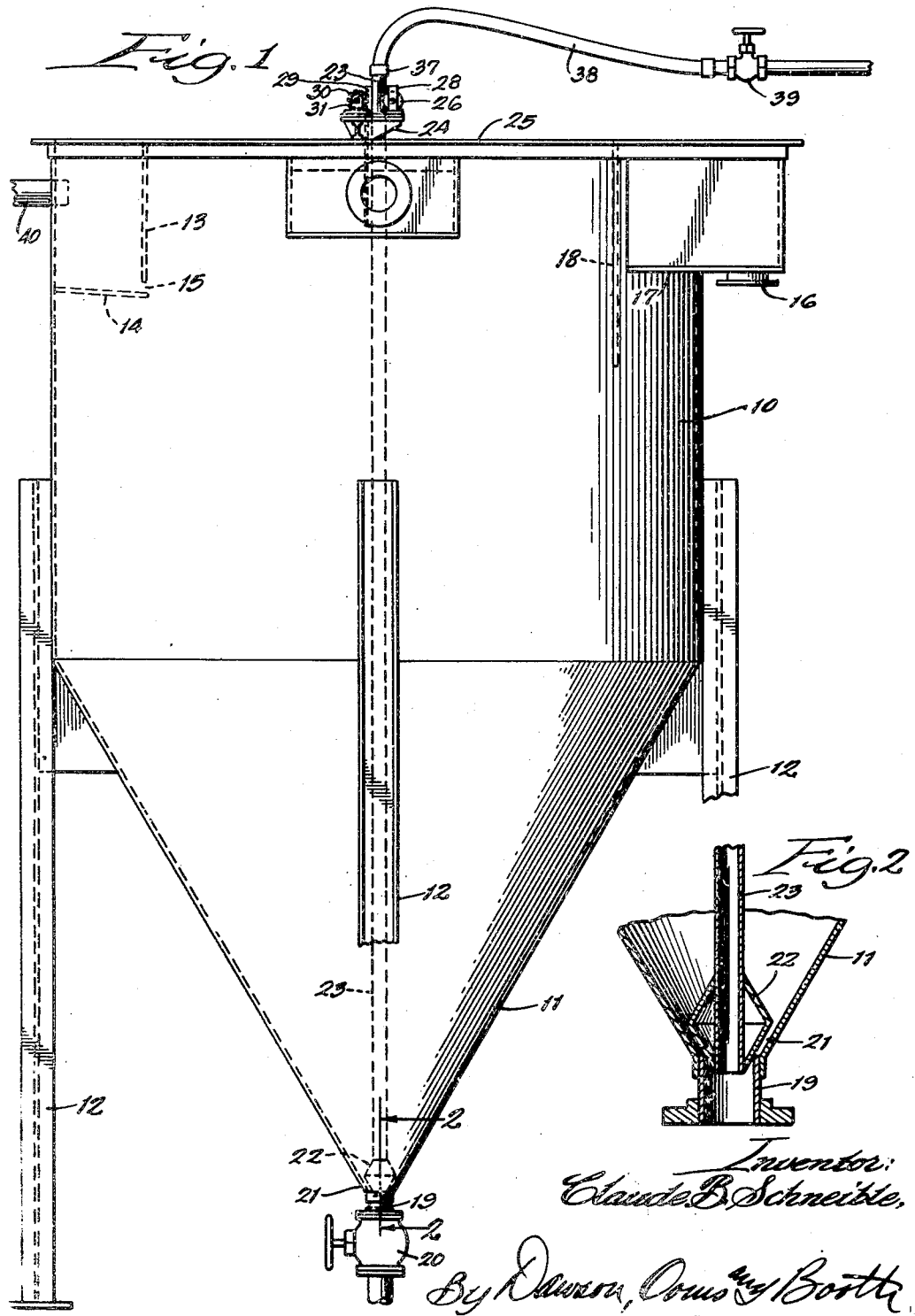
Inventor:
Claude B. Schneible,
By Dawson, Ooms and Booth
Attorneys.

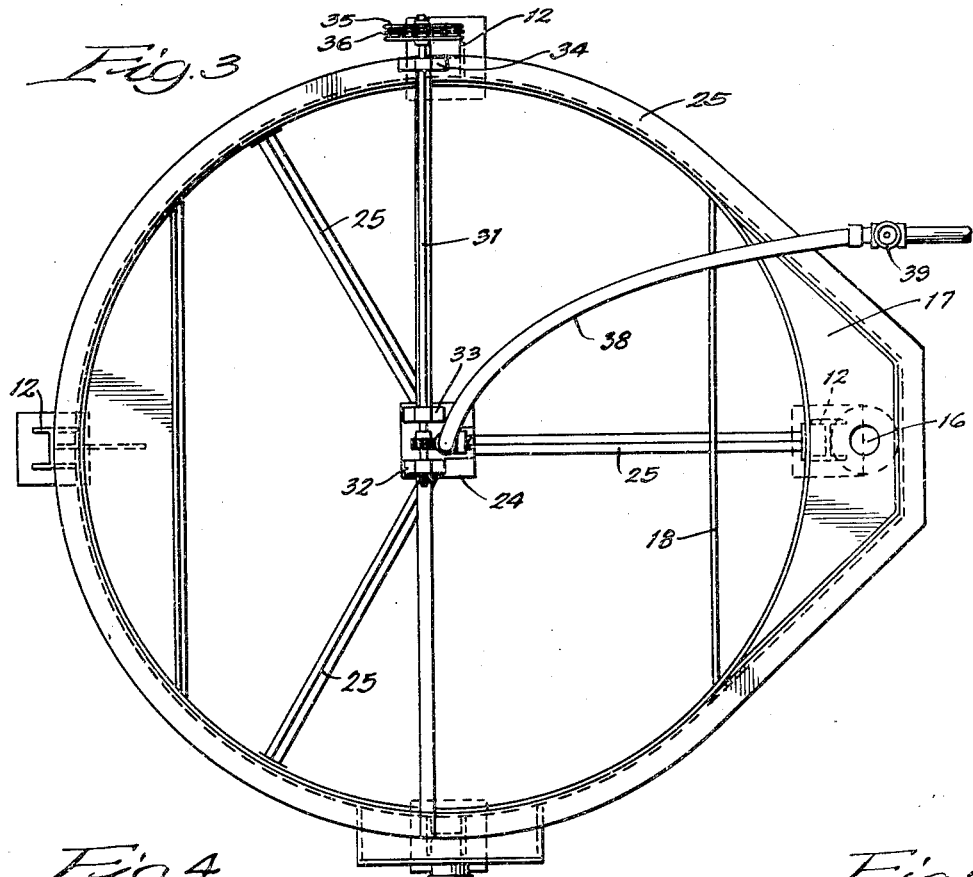
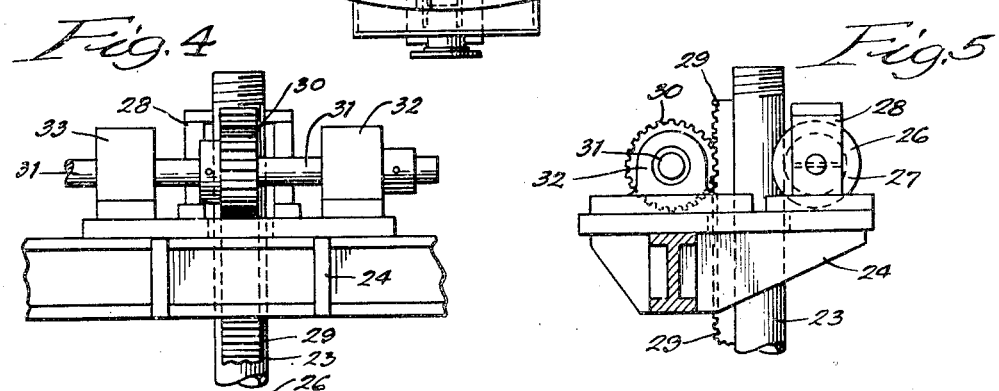
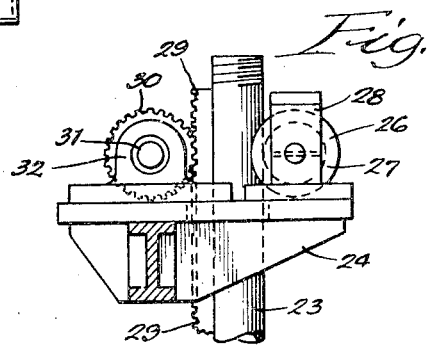
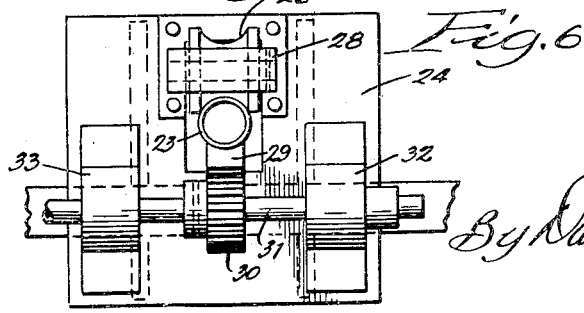

Patented Mar. 15, 1949

2,464,264

UNITED STATES PATENT OFFICE 2,464,264

SETTLING APPARATUS

Claude B. Schneible, Detroit, Mich.

Application June 4, 1945, Serial No. 597,551

9 Claims. (Cl. 210—57)

This invention relates to settling apparatus. It is particularly useful in connection with tanks in which solids collect along a conical bottom and where it is extremely difficult to remove the solids which pack tightest about the outlet itself. In settling tanks, as well as in certain apparatus for other operations, solids are often packed about an outlet opening or pipe and the pressure of the load above makes it extremely difficult to remove solids at the outlet.

An object of the present invention is to provide simple and inexpensive means whereby solids adjacent the outlet can be stirred or dislodged and the ready removal of such packed solids effected. A further object is to provide apparatus in which solids are settled and allowed to collect about an inclined bottom structure, and means associated with the outlet for bringing about the ready removal of such solids through the introduction of auxiliary liquid. Other specific objects and advantages will appear as the specification proceeds.

The invention is illustrated in a preferred embodiment, by the accompanying drawings, in which—

Figure 1 is a vertical sectional view of apparatus embodying my invention; Fig. 2, an enlarged detail sectional view, the section being taken as indicated at line 2 of Fig. 1; Fig. 3, a top plan view; Fig. 4, a view in elevation on an enlarged scale of the apparatus for hoisting the stem; Fig. 5, a side view in elevation of the apparatus shown in Fig. 4; and Fig. 6, a top plan view of the structure shown in Fig. 4.

While the invention is applicable to many types of tanks in which solids are to be removed, it is illustrated herein by reference to a tank commonly known as the skimmer type to which the invention is well applicable. The skimmer tank is used most commonly for the purpose of settling of solids collected from an air stream by dust collectors, etc. It permits the reuse of recirculating water to the collector system. However, the skimmer tank may be used separately from such systems and for the purpose of separating solids heavier than water for many other purposes.

In the illustration given, 10 designates a tank having converging bottom walls 11 in the shape of a cone. The tank is supported upon any suitable metal standards 12. On one side of the tank at the top is a distribution trough formed by the wall 13 and the lower wall 14, which provide between them an inlet 15 which permits the water to flow across and through the tank to the discharge outlet 16. The discharge outlet 16 communicates with a trough provided by the bottom wall 17 and extended walls of the tank, and the front end of the trough or box is guarded by a skimmer plate 18 which prevents floating elements from passing out of the discharge.

The conical walls 11 of the tank provide at their base an outlet which is secured to outlet pipe 19, as shown more clearly in Fig. 2. Outlet pipe 19 is controlled by a valve 20. The outlet in the lower end of the tank provides a valve seat 21 adapted to receive the valve 22 carried by the hollow valve stem 23.

The valve stem 23, which extends through the top portion of the tank, may be guided as shown in the illustration. It extends through a block member 24 which is supported by the radial metal beams 25, as shown more clearly in Figs. 1 and 3. Any suitable means for supporting the stem 23 upon the block member 24 may be employed. In the illustration given, I provide a roller 26 having side flanges 27 and mounted upon bracket 28. On the opposite side of the roller 26, the stem 23 is provided with a rack 29 which may be integral therewith or welded thereto. The rack 29 meshes with pinion 30 which is secured upon shaft 31. Shaft 31 is mounted in a horizontal plane upon the two bearings 32 and 33. The shaft 31 extends on one side across the tank and is journaled within the bearing 34. Upon the free end of the shaft is fixed a chain sheave 35 which receives an operating chain 36 so that the shaft 31 may be turned by hand operation of the chain and sheave.

The upper end of the stem 23 is preferably threaded to receive a metal connection 37 to which a flexible liquid hose connection 38 is attached. The hose 38 is controlled by a valve 39.

The inlet 40 for the bringing of solids-containing liquid to the tank may be placed as desired so as to discharge into the distribution trough provided by walls 13 and 14.

In the illustration given in connection with the skimmer tank, the water or other liquids containing solids, such as that collected from an air stream by dust collectors, as, for example, sand clay, abrasive dust from grinding wheels, etc., flows into the distribution trough provided by walls 13 and 14, and the water flows through outlet 15 across and through the tank to the discharge outlet 16. The solids settle by gravity to the lower part of the tank. Floating objects are prevented from passing out of the discharge outlet 16 by the skimmer plate 18.

In the handling of many solids, the settling of the granular material described and other similar material tends to form a hard mass in the cone bottom of the tank so that such solids cannot be removed simply by opening the valve 20. Such removal is, however, readily effective by the hydraulic stirrer device which is incorporated in the apparatus.

In the operation of my hydraulic stirrer, valve 20 is opened wide. Valve 22 is then raised off its seat by manually operating the chain sheave 35 by pulling on chain 36. Water valve 39 is then opened and water or other liquid allowed to flow through the valve stem 23 under pressure. By moving the valve 22 up and down, the water or other liquid flowing from the end of the stem 23 loosens the solids in the lower portion of the cone bottom and causes them to break up and pass out of the tank. In this manner, by making longer sweeps of the valve, an efficient agitation of solids is obtained and the entire mass readily removed from the tank.

While in the foregoing specification, I have referred to a skimmer tank and to certain specific details therein, it will be understood that the invention is applicable to other types of tanks and to other structures and that the details referred to may be modified widely by those skilled in the art without departing from the spirit of my invention.

I claim:

1. In apparatus for the removal of solids, a tank having a solids outlet in its lower portion and a liquid outlet in its upper portion, means for introducing liquid and solids into the tank, a hollow stem guided for reciprocal movement in said tank and having its lower end adjacent said outlet, closure means carried by the ends of said stem for closing said outlet, means for introducing liquid into said stem for discharge at said tank outlet to stir the solids adjacent the outlet, and means for reciprocating said stem while said liquid is being discharged.

2. In apparatus for the removal of solids, a tank having a solids outlet in its lower portion and a liquid outlet in its upper portion, means for introducing liquid and solids into the tank, a valve seated in said outlet, a hollow stem extending through said valve and guided for reciprocal movement in said tank, said stem being secured to said valve, means for introducing liquid into said stem, and means for reciprocating said stem while liquid is dicharged from said stem.

3. In apparatus for the removal of solids, a tank having a solids outlet in its lower portion and a liquid outlet in its upper portion, means for introducing liquid and solids into the tank, a valve-controlled outlet pipe communicating with said tank outlet, a hollow stem guided for reciprocal movement in said tank and having its lower end adjacent said outlet, closure means carried by the end portion of said stem for closing said outlet, means for introducing liquid into said stem for discharge at said tank outlet to stir the solids adjacent said outlet, and means for reciprocating said stem while said liquid is discharged through said stem.

4. In apparatus for the removal of solids, a tank having a conical bottom portion providing an outlet and having also a liquid outlet in its upper portion, means for introducing liquid and solids into the tank, a hollow stem guided for reciprocal movement in said tank and having its lower end adjacent said outlet, closure means carried by the lower end of said stem for sealing said outlet, means for introducing liquid into said stem for discharge into said tank outlet to stir the solids adjacent said outlet, and means for reciprocating said stem.

5. In apparatus for the removal of solids, a tank having a conical bottom portion provided with an outlet and having also a liquid outlet in its upper portion, means for introducing liquid and solids into the tank, a valve seated in said outlet, a hollow stem having its lower portion extending through said valve and its upper portion guided for reciprocal movement in said tank, said valve being fixed to the lower end of said hollow stem, means for introducing liquid into said stem for discharge in said tank outlet, and means for reciprocating said stem.

6. In apparatus for the removal of solids, a tank having a conical bottom portion and having an outlet and a valve seat about said outlet, said tank having also a liquid outlet in its upper portion, means for introducing liquid and solids into said tank, a valve seated in said outlet seat, a hollow stem having its lower portion extending through said valve and its upper portion guided for reciprocal movement, said valve being fixed to said stem, a valve-controlled outlet pipe communicating with said tank outlet, means for introducing liquid into said stem for discharge through said stem, and means for reciprocating said stem during discharge of liquid through said stem.

7. In settling apparatus, a tank having a conical bottom portion terminating in an outlet, said tank being also provided in its upper portion with a liquid inlet and a liquid outlet spaced from each other, a skimmer plate adjacent said liquid outlet, a valve-controlled outlet pipe communicating with said bottom tank outlet, a valve member adapted to seat in said bottom tank outlet, a hollow stem having its lower portion extending through said valve and its upper portion guided for reciprocal movement, means for discharging liquid under pressure into said stem, and means for reciprocating said stem while said liquid is discharged through said stem.

8. In settling apparatus, a tank having a conical bottom portion terminating in an outlet, said tank being also provided in its upper portion with a liquid inlet and a liquid outlet spaced opposite each other, a skimmer plate adjacent said liquid outlet, a valve-controlled outlet pipe communicating with said tank outlet, a valve member adapted to seat in said tank outlet, a hollow stem having its lower portion extending through said valve and its upper portion guided for reciprocal movement, means for discharging liquid under pressure into said stem, and means for reciprocating said stem while said liquid is discharged therethrough, said means comprising a pinion carried by a shaft, means for rotating said shaft, and a rack secured to said stem and meshing with said pinion.

9. In settling apparatus, a tank having a conical bottom portion terminating in an outlet, said tank being also provided in its upper portion with a liquid inlet and a liquid outlet spaced from each other, a skimmer plate adjacent said liquid outlet, a valve-controlled outlet pipe communicating with said tank outlet, a valve member adapted to seat in said tank outlet, a hollow stem having its lower portion extending through said valve and its upper portion guided for reciprocal movement, means for discharging liquid under pressure into said stem, and means for reciprocating said stem while said liquid is being discharged therethrough, said means comprising a rack fixed to said shaft, a pinion meshing with said rack, a shaft mounted for rotation on said tank and carrying said pinion, and a chain-equipped sheave fixed to said shaft.

CLAUDE B. SCHNEIBLE.

REFERENCES CITED

The following references are of record in the file of this patent:

UNITED STATES PATENTS

| Number | Name | Date |
|---|---|---|
| 353,775 | Booraem | Dec. 7, 1886 |
| 845,520 | Callow | Feb. 26, 1907 |
| 919,144 | Elmore | Apr. 20, 1909 |
| 1,005,953 | Freymuth | Oct. 17, 1911 |
| 1,074,192 | Monell | Sept. 30, 1913 |
| 1,077,476 | Kaibel | Nov. 4, 1913 |
| 1,147,356 | Allen | July 20, 1915 |
| 1,507,098 | Walker | Sept. 2, 1924 |
| 1,658,040 | Cohn | Feb. 7, 1928 |
| 1,833,390 | Carter | Nov. 24, 1931 |
| 1,995,559 | Andrews | Mar. 26, 1935 |
| 2,281,590 | Newton | May 5, 1942 |
| 2,297,311 | Mead et al. | Sept. 29, 1942 |
| 2,301,371 | Corwin | Nov. 10, 1942 |
| 2,360,817 | Scott | Oct. 17, 1944 |